(12) United States Patent
Munro et al.

(10) Patent No.: US 6,854,855 B2
(45) Date of Patent: Feb. 15, 2005

(54) ASYMMETRIC ALTERNATING PRISM ARRAYS

(75) Inventors: James F. Munro, Ontario, NY (US); John A. Futhey, Santa Rosa, CA (US)

(73) Assignee: Reflexite Corporation, Avon, CT (US)

(*) Notice: Subject to any disclaimer, the term of this patent is extended or adjusted under 35 U.S.C. 154(b) by 335 days.

(21) Appl. No.: 09/726,239

(22) Filed: Nov. 29, 2000

(65) Prior Publication Data

US 2001/0040799 A1 Nov. 15, 2001

Related U.S. Application Data

(60) Provisional application No. 60/208,339, filed on May 31, 2000, and provisional application No. 60/168,586, filed on Dec. 2, 1999.

(51) Int. Cl.[7] .............................................. F21V 5/02
(52) U.S. Cl. ......................... 362/31; 362/330; 362/339
(58) Field of Search ........................... 362/26, 31, 330, 362/331, 332, 339; 235/454, 455; 359/831, 833, 834, 837

(56) References Cited

U.S. PATENT DOCUMENTS

| | | | |
|---|---|---|---|
| 4,615,579 A | 10/1986 | Whitehead | 350/96.1 |
| 4,750,798 A | 6/1988 | Whitehead | 350/96.1 |
| 5,079,675 A | 1/1992 | Nakayama | 362/31 |
| 5,339,179 A | * 8/1994 | Rudisill et al. | 362/31 |
| 5,396,350 A | 3/1995 | Beeson et al. | 359/40 |
| 5,629,784 A | 5/1997 | Abileah et al. | 349/112 |
| 5,851,062 A | * 12/1998 | Shinohara et al. | 362/31 |
| 5,917,664 A | 6/1999 | O'Neill et al. | 359/831 |
| 5,971,559 A | 10/1999 | Ishikawa et al. | 362/31 |
| 6,139,173 A | * 10/2000 | Hanamori | 362/332 |
| 6,164,799 A | 12/2000 | Hirmer et al. | |

FOREIGN PATENT DOCUMENTS

| | | |
|---|---|---|
| FR | 2049387 | 3/1971 |
| WO | WO 01/27663 A1 | 4/2001 |

* cited by examiner

Primary Examiner—Y. My Quach-Lee
(74) Attorney, Agent, or Firm—Hamilton, Brook, Smith & Reynolds, P.C.

(57) ABSTRACT

A luminaire is provided which includes a light source, a light guide that receives light radiating from the light source, and a plurality of prisms adjacent the light guide that redirect the light from the light guide substantially perpendicular to a longitudinal axis of the light guide. The prism angles, in one embodiment, are 25°-90°-65°. The fine pitch prism arrays preferably alternate or flip-flop every few millimeters, for example, one to two millimeters to create the visual appearance of bright and dark bands which cause the structure to appear like macro prisms.

25 Claims, 8 Drawing Sheets

| Angle | Across Bulb lux @ 1 meter | With Bulb |
|---|---|---|
| -70 | 4.12 | 4.5 |
| -60 | 8.08 | 7.93 |
| -55 | 10.5 | 10.1 |
| -50 | 15.3 | 12.3 |
| -45 | 30.0 | 14.4 |
| -40 | 44.3 | 16.0 |
| -35 | 48.0 | 18.0 |
| -30 | 49.1 | 21.0 |
| -25 | 47.3 | 23.5 |
| -20 | 44.2 | 27.5 |
| -15 | 44.1 | 33.2 |
| -10 | 45.7 | 37.5 |
| -5 | 44.2 | 40.7 |
| 0 | 42.8 | 42.8 |
| 5 | 43.8 | 41.7 |
| 10 | 45.1 | 40.6 |
| 15 | 47.0 | 38.4 |
| 20 | 46.1 | 31.9 |
| 25 | 46.9 | 27.3 |
| 30 | 48.5 | 23.1 |
| 35 | 50.1 | 20.3 |
| 40 | 46.7 | 17.9 |
| 45 | 42.1 | 15.5 |
| 50 | 26.6 | 12.8 |
| 55 | 8.87 | 10.8 |
| 60 | 5.94 | 9.11 |
| 70 | 4.94 | 5.5 |

– – Measured Data   —— Theoretical Data

ASYMMETRIC ALTERNATING PRISM ARRAYS

RELATED APPLICATIONS

This application claims the benefit of U.S. application Ser. No. 60/208,339, filed May 31, 2000, and U.S. application Ser. No. 60/168,586, filed on Dec. 2, 1999, the entire teachings of the above applications are incorporated herein by reference.

BACKGROUND OF THE INVENTION

Luminaires typically include a lighting source, a waveguide, and microprisms used to redirect the light in a desired direction. These luminaires are used to provide a more uniform light distribution than conventional light systems and alleviate glare in applications such as office space, boardrooms, and customer service centers.

SUMMARY OF THE INVENTION

A luminaire is provided which includes a light source, a light guide that receives light radiating from the light source, and a tilted prism array for redirecting the light in a first direction. In one embodiment, the prism array, which can include linear prisms, includes a cross-sectional profile that periodically alternates orientation along the light guide. The linear prisms can have included angles of 25, 90, and 65 degrees. The prism array can alternate or flip-flop in orientation every few millimeters, for example, one to two millimeters. A tilted prism can have two sides which meet at a peak with a first length from the valley to the peak on one side and a second length from the valley to the peak on a second side of the prism, where the first length is different in length from the second length, thereby tilting or canting the prisms. The tilting angle of the prisms is between the optical axis and a line perpendicular to the window side. The tilting angle can be in the range between about 20 and 70 degrees.

The prism array can include peaks and valleys that form the cross-sectional profile that alternates along a first axis. The prism array can also include a second cross-sectional profile that alternates orientation along a second axis that is different than the first axis, such as substantially perpendicular or offset about 60 degrees relative to the first axis. The prism array can further include a third cross-sectional profile that alternates orientation along a third axis that is different than the second axis and the first axis. In one embodiment, the third axis is offset about 60 degrees relative to the second axis. The prism array can be disposed on a top surface of the light guide.

An optical microstructure is also provided which includes a tilted prism array that periodically alternates orientation of the tilted prism array along a first axis. The prism array can also include a cross-sectional profile that includes peaks and valleys that periodically alternate orientation along a second axis. In alternative embodiments, the prism array includes another cross-sectional profile that periodically alternates along a third axis. The optical microstructure can be disposed on a first surface of a film. A prism array can be disposed on a second surface of the film. The prism array on the second surface can be tilted and periodically alternate orientation along at least one axis. The purpose of the periodic alternate orientation of the prism angles is to create alternating bands of bright and dark lines which can be seen viewing the surface of the luminaire. Very small or fine pitch prisms that are not visible to the human eye beyond 0.5 meters can be made to look like macro prisms because of the visibility of the bright and dark bands. Low cost manufacturing concepts, such as continuous casting, can be used to form the precision fine pitch alternating prism groups and achieve the appearance of a precision macro prism, for example, 0.508 to 2.54mm (0.02 to 0.1 inch) pitch, which would normally be made with a more expensive manufacturing concept, such as compression molding.

Multi-faceted prisms can be used, for example, prisms that have more than one slope on a facet. Further, prisms can be used which have curved facets or curved prism tips and valleys. These features are used to smooth the resulting light distribution.

A method for redirecting light is also provided which includes providing a light source, receiving light radiating from the light source in a light guide, and redirecting the light in a first direction with a tilted prism array that includes a cross-sectional profile that periodically alternates orientation along a first axis. The tilted prism array can include a second cross-sectional profile that periodically alternates orientation along a second axis that is different than the first axis. The tilted prism array can further include a third cross-sectional profile that includes peaks and valleys that periodically alternate orientation along a third axis that is different than the second axis.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. Generally, the invention is directed to a backlit display apparatus ("BLDA") having a coarse appearance. An example of a BLDA is disclosed in U.S. Pat. No. 5,629,784, issued to Abileah et al. on May 13, 1997, the teachings of which are incorporated herein in its entirety by reference.

Figure 1:
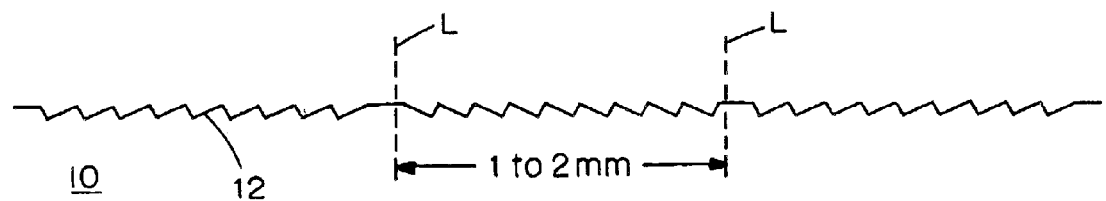
FIG. 1 is a partial cross-sectional view of a waveguide for use in a display apparatus particularly illustrating linear prisms arranged in accordance with the present invention.

FIG. 1 is a partial cross-sectional view of a waveguide or light guide 10 for use in a BLDA particularly illustrating the linear prisms 12. The prism angles, in one embodiment, are 25°–90°–65° (90° is the peak angle with a first side of the prism is 25° from the horizontal to peak and a second side of the prism is 65° from the horizontal to the peak). The pitch, or tip to tip spacing, in one embodiment, is in the range from about 0.0508 to 0.254 mm (0.002 to 0.01 inches). The tilting angle, as measured from the peak angle, can be in the range between about 20 and 70 degrees. The prism array preferably alternates or flip-flops in orientation, i.e., the array includes mirror images with respect to line L. In one embodiment, the prism array flip-flops every few millimeters, for example, one to two millimeters.

The waveguide 10 can be solid being formed from a material such as polymethyl methacrylate (PMMA) or other suitable materials. In alternative embodiments, any of the prisms disclosed herein can be used with hollow waveguides in any of the embodiments as disclosed in U.S. application Ser. No. 09/725,338, filed on Nov. 29, 2000, the contents of which are incorporated herein by reference.

When viewed from below, one set of fine pitch prisms 12 is generally oriented to reflect light towards the viewer, and the neighboring pair away from the viewer. Thus, the viewer sees a set of alternating bright and dark lines, which can be referred to as a coarse appearance. It is understood that the number of prisms 12 within a prism grouping is variable, which means that the width of a group and its coarseness can be easily controlled.

Figure 2:
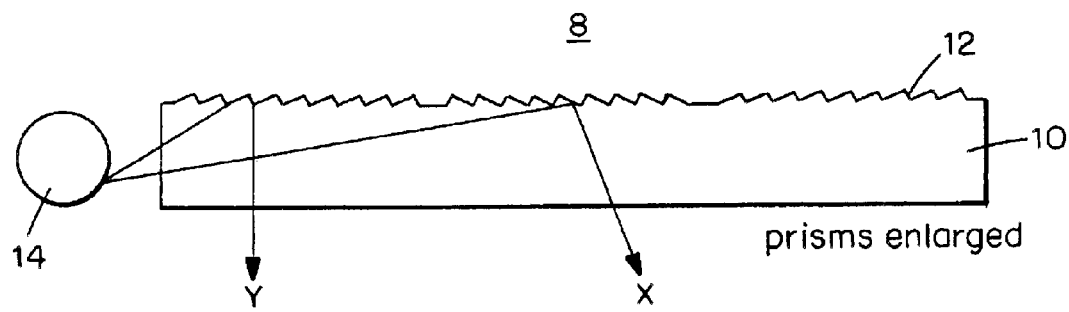
FIG. 2 is a cross-sectional view of a luminaire employing waveguide of FIG. 1.

FIG. 2 illustrates a luminaire 8 having an exemplary waveguide 10 coupled to a light source 14, such as a fluorescent cylindrical bulb. A viewer at point X sees the center group of prisms 12 as brighter because they direct light from the source 14 to point X. Since the light from adjacent prism groups is directed elsewhere, these groups appear dark. At point Y, the center group can appear dark, and the adjacent groups are brighter. At some point between X and Y, the groups appear to be equal in brightness. Further, the output light distribution is such that the image of the light source 14, such as a cylindrical bulb, is masked. It is noted that the prisms 12 of FIG. 2 are substantially enlarged for illustrative purposes only.

Figure 3:
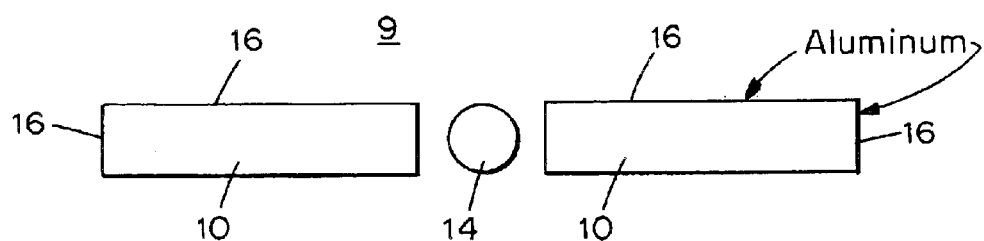
FIG. 3 is a cross-sectional view of a pair of waveguides which receive and direct light from a light source substantially downward.

FIG. 3 illustrates a luminaire 9 having a pair of waveguides 10 which receive and direct light from source 14 substantially downward. A reflective coating 16, such as vacuum metalized aluminum or metalized polyester (PET) or polished aluminum, is provided on the top and end surfaces of the waveguide 10 to allow the light rays to be directed substantially downward.

Figure 4:
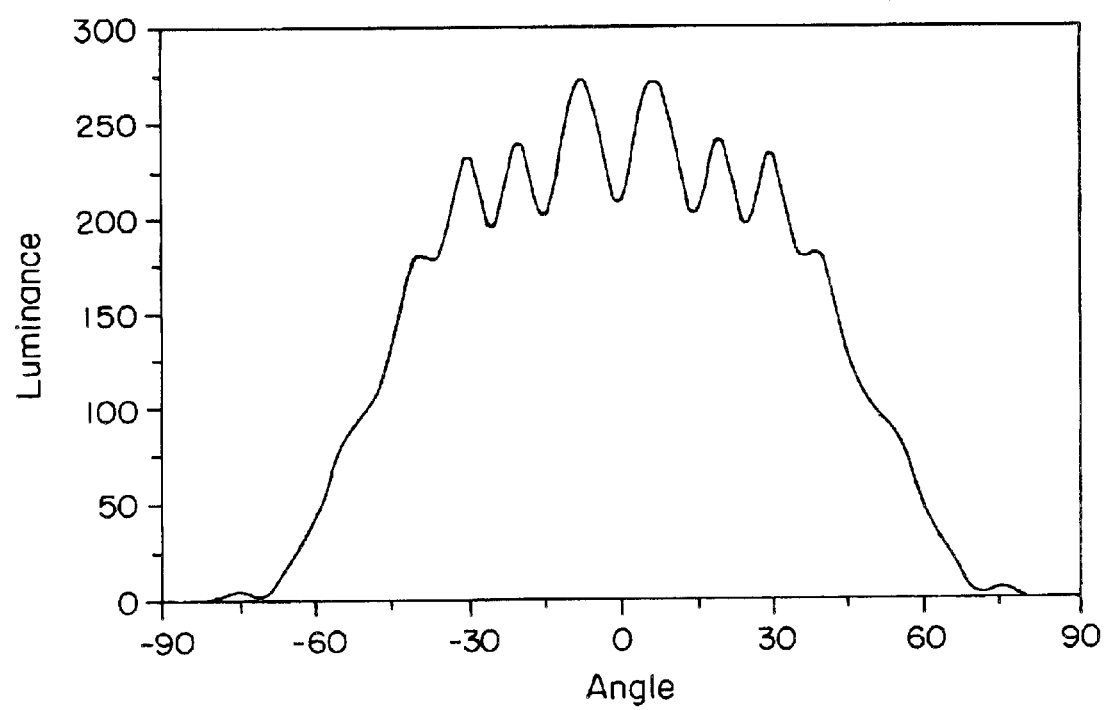
FIG. 4 is a graph illustrating light output of an exemplary backlit display apparatus at an observation or viewing angle range of about −90° to +90°.

FIG. 4 is a graph illustrating light output (luminance: y axis) of an exemplary BLDA at an observation or viewing angle range of about −90° to +90° (x axis). The coarseness or banding appears in this embodiment from approximately −45° to +45°. In this embodiment, the pitch, or tip to tip spacing, is in the range from about 0.0508 to 0.254 mm (0.002 to 0.01 inches).

Figure 5:
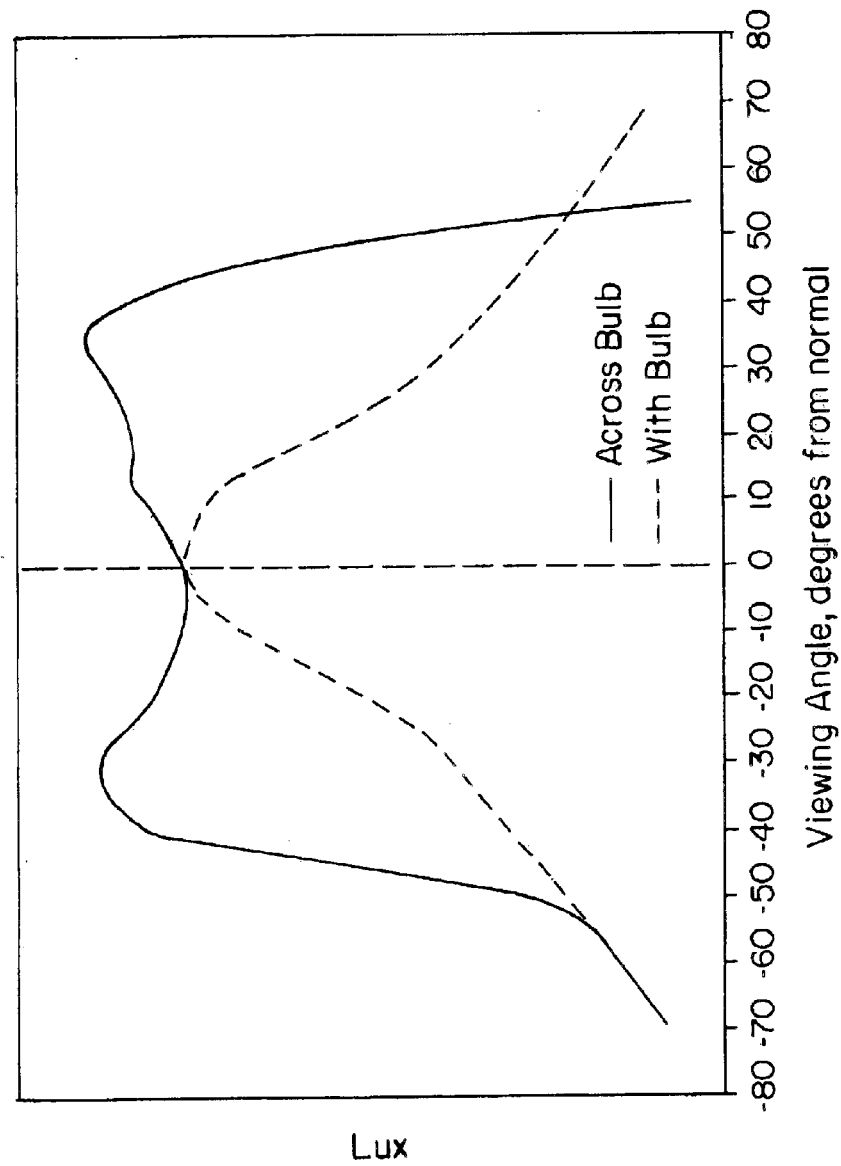
FIG. 5 are graphs illustrating light output of an exemplary backlit display apparatus at viewing range of about −70° to +70°.

FIG. 5 are graphs illustrating light output (lux: y axis) of an exemplary BLDA at viewing angle range of about −70° to +70° from normal (x axis). One graph illustrates the light output across the light source or bulb while the second graph illustrates the light output with the bulb. The data for the graphs are shown in FIG. 5.

Figure 6:
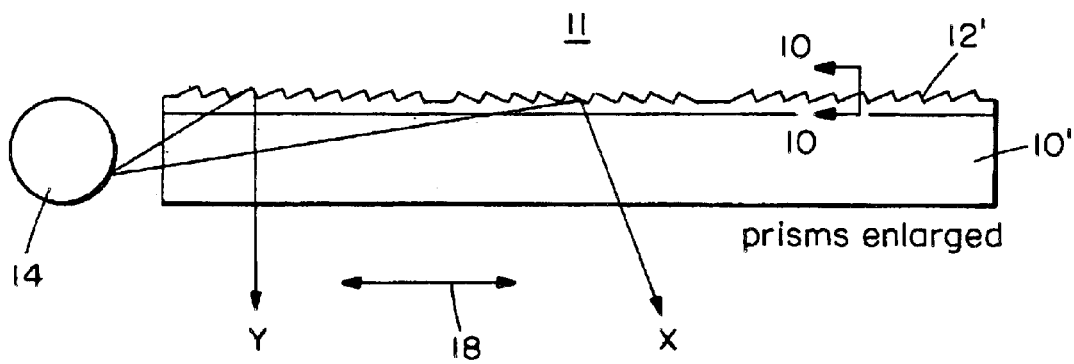
FIG. 6 is a cross-sectional view of an alternative embodiment of a luminaire in accordance with the present invention.

FIG. 6 illustrates an alternative embodiment of a luminaire 11 having an exemplary waveguide 10' and prisms 12' wherein the waveguide and prisms are formed separately and laminated together, for example, with a pressure sensitive adhesive (PSA). The waveguide 10' and prisms 12' can be formed from different materials. In one embodiment, the prisms 12' can be formed from an ultraviolet (UV) curable acrylate thermoset or other suitable materials. Either the waveguide 10' or the prisms 12' (or both) can be colored and/or have printed patterns formed thereon (e.g., logos) to customize the appearance of the luminaire as disclosed in U.S. application Ser. No. 09/013,696, now U.S. Pat. No. 6,119,751, and Ser. No. 09/170,014, now U.S. Pat. No. 6,120,636, filed Jan. 26, 1998 and Oct. 13, 1998, respectively, the teachings of each being incorporated herein in their entirety by reference.

Figure 7:
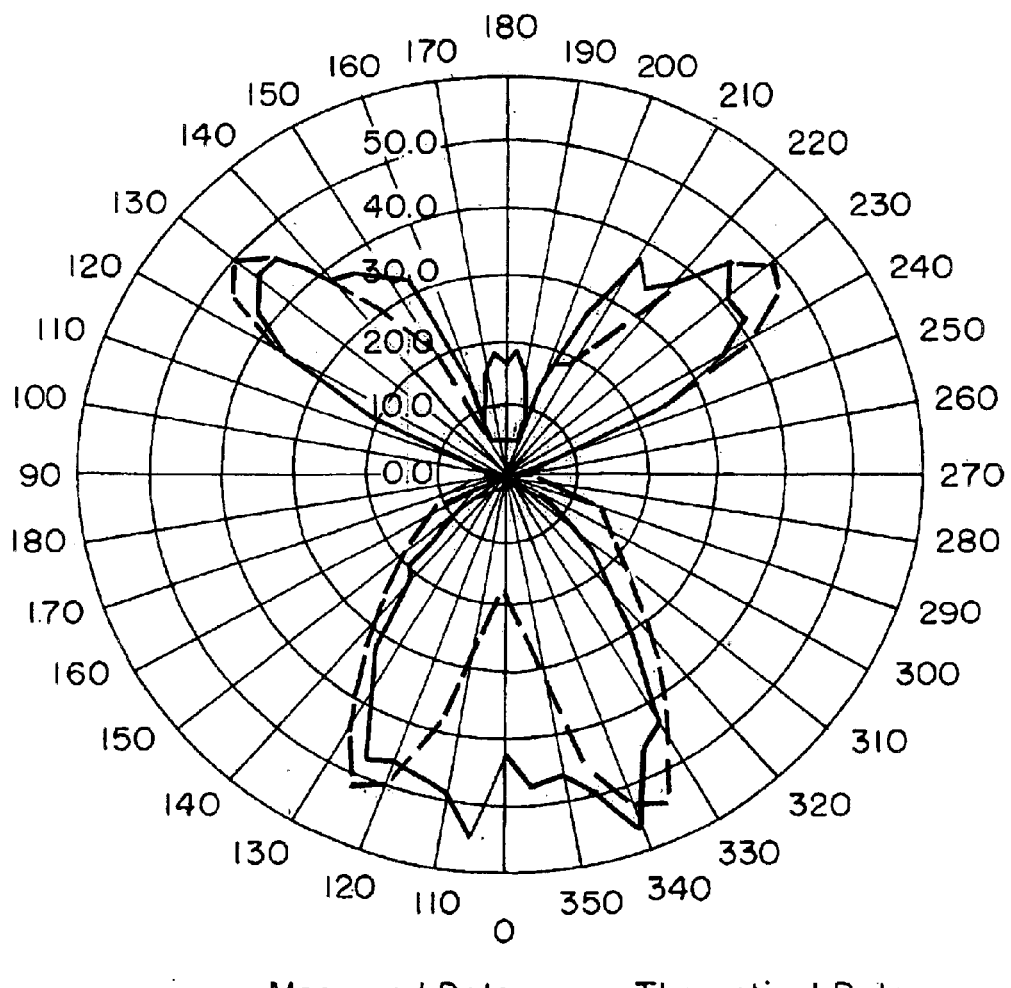
FIG. 7 illustrates photometric data from the luminaire of FIG. 6.

FIG. 7 illustrates photometric data from a light system, such as shown in FIG. 6. The photodetector was placed about 1.0 meter from the light source. The data represents theoretical and actual measurements taken across the bulb direction, i.e., in the direction of the two-headed arrow 18 of FIG. 6.

Figure 8:
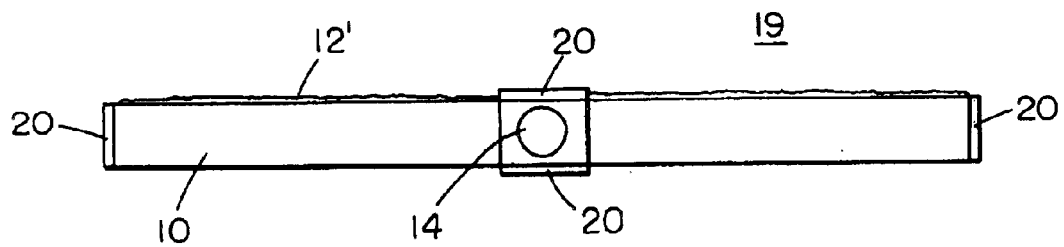
FIG. 8 is a cross-sectional view of another embodiment of a luminaire in accordance with the present invention.

FIG. 8 illustrates another embodiment of a luminaire 19 having mirrors 20 positioned on the ends of the waveguide 10 and above and below the light source 14. The prisms 12' can be integral to the waveguide 10, or alternatively, be laminated to the waveguide 10.

Figure 9:
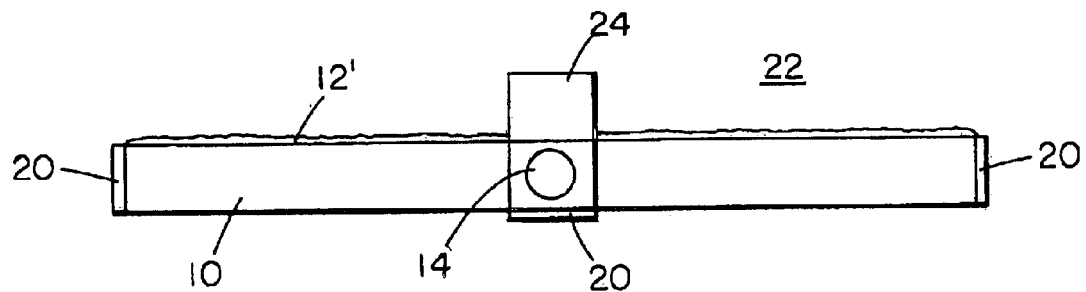
FIG. 9 is a cross-sectional view of yet another embodiment of a luminaire in accordance with the present invention.

FIG. 9 illustrates a luminaire 22 which is similar to the embodiment of FIG. 8 but instead of a mirror above the light source 14, a baffle 24 is provided there instead. The baffle 24 can include a white surface which absorbs, diffracts, and scatters light from the light source 14. It is believed that this baffle 24 more uniformly directs the light rays into the waveguide 10 for achieving a more uniform distribution of the light rays in the waveguide.

The table below compares the viewing angle, the measured luminance for the luminaire 19 of FIG. 8 and theoretical output for a luminaire having a baffle such as the luminaire 22 of FIG. 9. In this embodiment, the pitch of the prisms is about 0.254 mm (0.01 inches).

| Angle | Measured Luminance (cd/lux/m²) | Theoretical with Baffle |
|---|---|---|
| 180 | 5.7 | 16.8458 |
| 185 | 5.1 | 18.9760 |
| 190 | 5.1 | 15.2260 |
| 195 | 5.3 | 8.9539 |
| 200 | 7.6 | 15.5152 |
| 205 | 13.8 | 27.0215 |
| 210 | 19.9 | 37.7291 |
| 215 | 28.2 | 33.6113 |
| 220 | 37.0 | 37.6789 |
| 225 | 44.7 | 44.4249 |
| 230 | 48.9 | 40.6028 |
| 235 | 47.4 | 41.2673 |
| 240 | 39.3 | 35.1872 |
| 245 | 26.1 | 24.0277 |
| 250 | 10.9 | 10.6000 |
| 255 | 4.9 | 4.7000 |
| 260 | 4.6 | 4.5000 |
| 265 | 4.3 | 4.2000 |
| 270 | 1.7 | 1.6000 |
| 275 | 2.8 | 2.7000 |
| 280 | 5.5 | 5.4000 |
| 285 | 9.5 | 8.8104 |
| 290 | 13.0 | 10.9029 |
| 295 | 15.5 | 5.3704 |
| 300 | 17.0 | 8.9190 |
| 305 | 18.7 | 5.3252 |
| 310 | 21.7 | 13.4086 |
| 315 | 26.2 | 18.7654 |
| 320 | 31.8 | 22.4112 |
| 355 | 38.3 | 32.3889 |
| 330 | 45.6 | 43.3254 |
| 335 | 54.5 | 45.7689 |
| 340 | 53.0 | 56.6042 |
| 345 | 45.1 | 49.3210 |
| 350 | 33.0 | 45.7512 |
| 355 | 21.8 | 47.1792 |
| 0 | 17.4 | 41.8723 |
| 5 | 20.2 | 54.5000 |
| 10 | 30.4 | 48.0831 |
| 15 | 41.6 | 46.7072 |
| 20 | 49.6 | 45.5090 |
| 25 | 5136 | 47.0374 |
| 30 | 44.0 | 38.3052 |
| 35 | 36.0 | 32.6696 |
| 40 | 29.2 | 21.6011 |
| 45 | 23.8 | 19.2380 |
| 50 | 19.2 | 11.7001 |
| 55 | 15.7 | 6.5985 |
| 60 | 13.4 | 4.6328 |
| 65 | 12.0 | 7.7141 |
| 70 | 10.0 | 9.9115 |
| 75 | 7.5 | 7.4000 |
| 80 | 7.4 | 7.3000 |
| 85 | 3.1 | 3.0000 |
| 90 | 1.9 | 1.8000 |
| 95 | 3.4 | 3.3000 |
| 100 | 3.7 | 3.6000 |
| 105 | 4.0 | 3.9000 |
| 110 | 7.2 | 7.1000 |
| 115 | 21.5 | 21.4000 |
| 120 | 37.2 | 35.3846 |
| 125 | 46.5 | 42.8789 |
| 130 | 49.7 | 45.9643 |
| 135 | 46.7 | 45.6916 |
| 140 | 38.6 | 38.2638 |
| 145 | 29.6 | 36.6630 |
| 150 | 21.1 | 33.6147 |
| 155 | 14.3 | 32.8648 |
| 160 | 8.2 | 13.3652 |
| 165 | 5.5 | 10.2196 |
| 170 | 5.1 | 15.5559 |
| 175 | 5.3 | 18.9760 |

The linear prisms 12 as described above can be referred to as a one-dimensional structure. That is, the prism structures 12 have peaks and valleys that form a cross-sectional view running along one axis. In alternative embodiments, the prisms 12 can include multiple-dimensional structures, such as two-dimensional structures and three-dimensional structures that form cross-sectional profiles along second and third axes, respectively.

Figure 10:
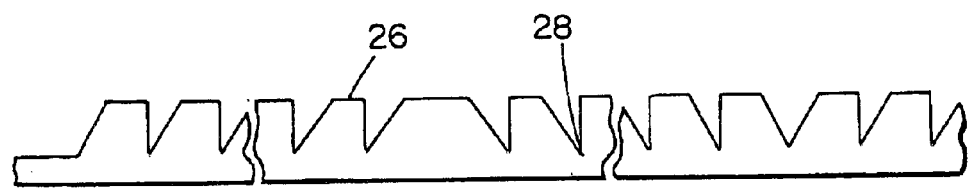
FIG. 10 is a cross-sectional view taken along line 10-10 of FIG. 6.
Figure 11:
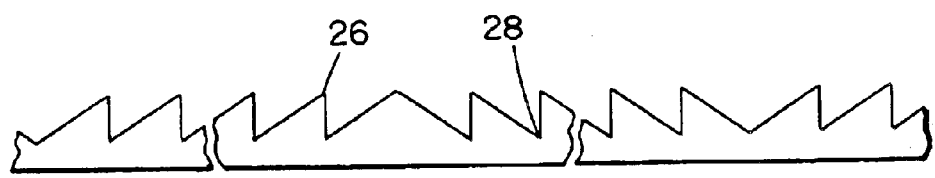
FIG. 11 is an enlarged view of the prisms shown in FIG. 6.
Figures 12A, 12B, 12C:
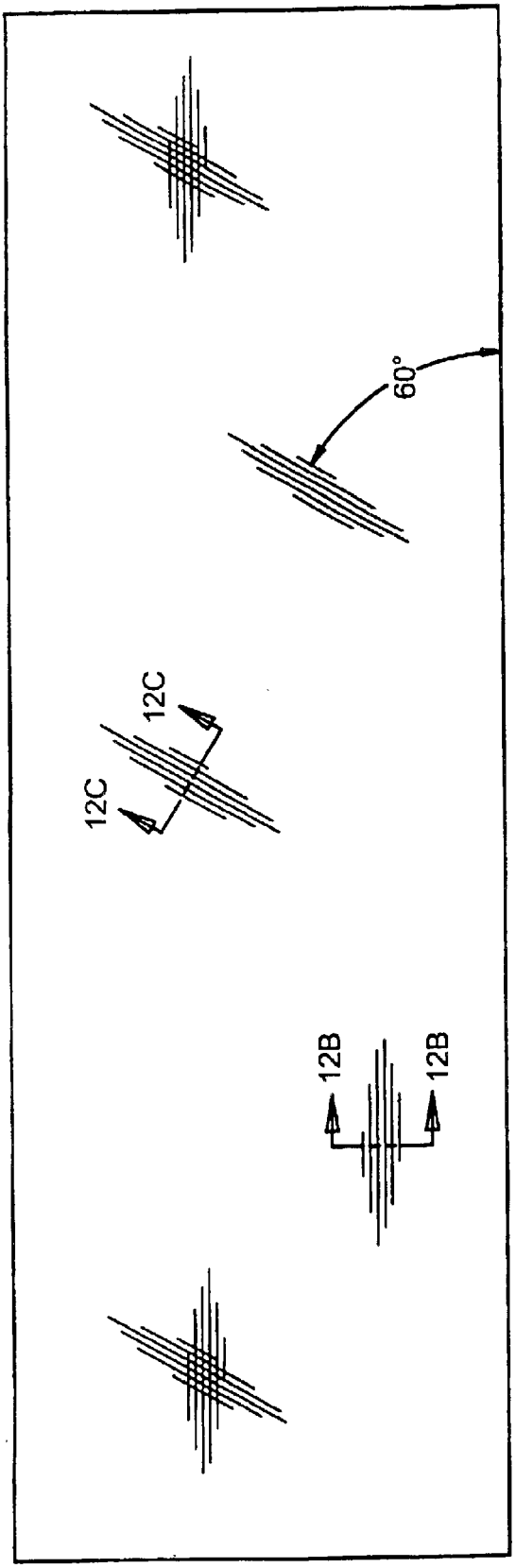
FIG. 12A is a top view of a luminaire having two cross-sectional profiles formed at 60 degrees relative to one another.
FIG. 12B is a sectional view of the luminaire of FIG. 12A taken along line 12B—12B.
FIG. 12C is a sectional view of the luminaire of FIG. 12A taken along line 12C—12C.
Figures 13A, 13B, 13C, 13D:
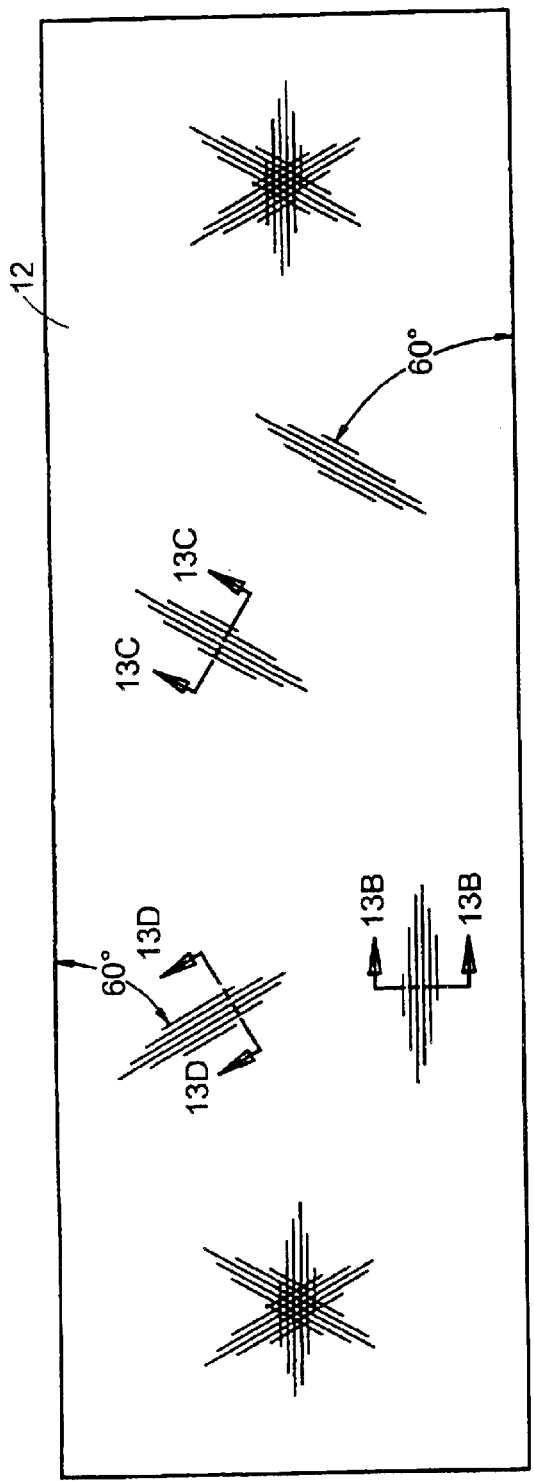
FIG. 13A is a top view of a luminaire having three cross-sectional profiles formed at 60 degree intervals.
FIG. 13B is a sectional view of the luminaire of FIG. 13A taken along line 13B—13B.
FIG. 13C is a sectional view of the luminaire of FIG. 13A taken along line 13C—13C.
FIG. 13D is a sectional view of the luminaire of FIG. 13A taken along line 13D—13D.

For example, in the embodiment of FIG. 6, a two-dimensional prism structure can be constructed by forming peaks 26 and valleys 28, i.e., a second cross-sectional profile, perpendicular to the longitudinal axes of the existing linear prisms 12', i.e., into the paper. Thus, a cross-sectional view taken along line 10—10 is seen in FIG. 10. If the prisms are spaced apart, the peaks 26 have a flat portion as also illustrated in FIG. 10. FIG. 11 illustrates an enlarged view of the prisms of FIG. 6 which illustrates peaks 26 and valleys 28 of the prism array. This facilitates controlling of the light rays exiting the waveguide at every angle. In alternative embodiments, the prism array can include cross-sectional profiles that can be offset at about 60 degree intervals to provide a three-dimensional structure. In further embodiments, the cross-sectional profiles can be offset at various angles to provide a multiple-dimensional structure.

Figure 14:
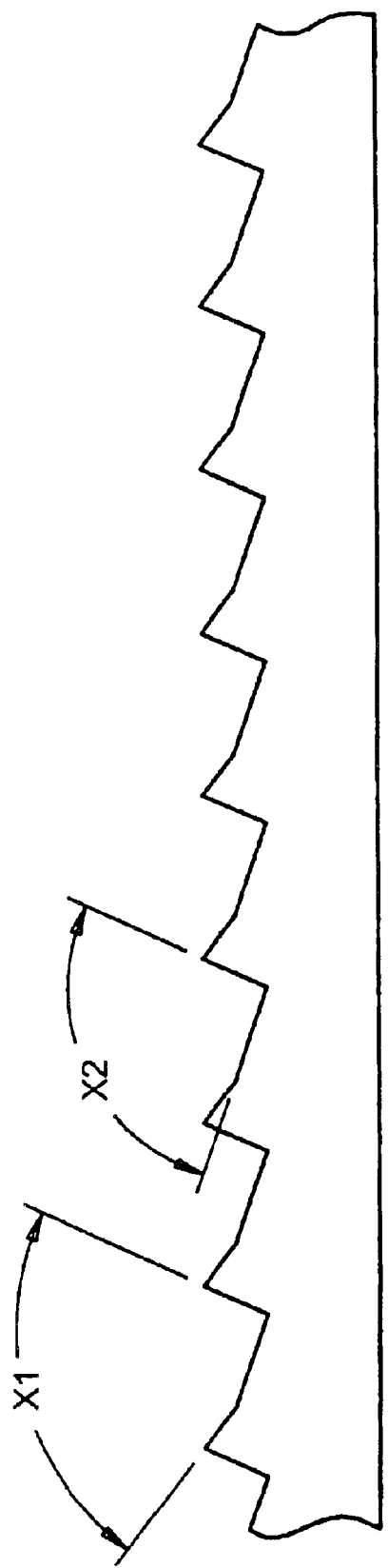
FIG. 14 is a perspective view of a luminaire having multi-planar facets.
Figure 15:
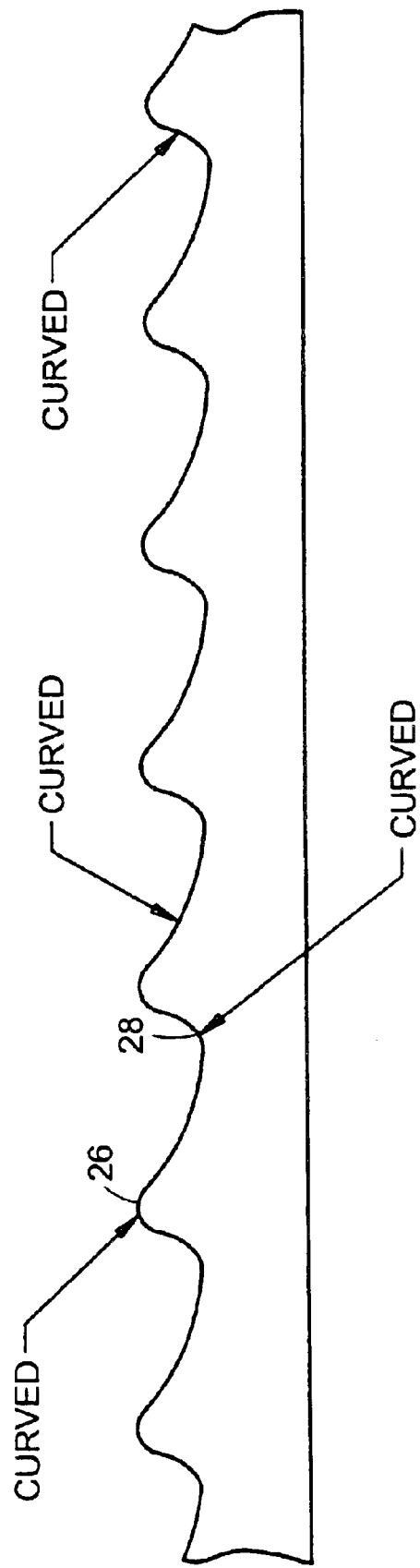
FIG. 15 is a perspective view of a luminaire having curved prism tips and valleys.

A luminaire having cross-sectional profiles formed at 60 degrees relative to one another is shown in FIGS. 12A–12G. A luminaire having cross-sectional profiles formed at 60 degree intervals is shown in FIGS. 13A–13D. A perspective view of a luminaire having multi-planar facets is shown in FIG. 14. A perspective view of a luminaire having curved prism tips and valleys is shown in FIG. 15.

In any of the disclosed embodiments, multi-faceted prisms can be used, for example, prisms that have more than one slope on a facet. Further, prisms can be used which have curved facets or curved prism tips and valleys. These features can be used to smooth the resulting light distribution.

While this invention has been particularly shown and described with references to preferred embodiments thereof, it will be understood by those skilled in the art that various changes in form and details may be made therein without departing from the scope of the invention encompassed by the appended claims.

What is claimed is:

1. A luminaire, comprising:
    a light source;
    a light guide that receives light radiating from the light source; and
    a tilted prism array for redirecting the light in a first direction, wherein the prism array includes a cross-sectional profile that periodically alternates orientation along the light guide, the prism array including peaks and valleys, substantially all of the peaks being disposed in about a single plane.

2. The luminaire of claim 1 wherein the prism array includes linear prisms.

3. The luminaire of claim 2 wherein the linear prisms have included angles of 25, 90, and 65 degrees.

4. The luminaire of claim 1 wherein the prism may includes peaks and valleys that form the cross-sectional profile that alternates along a first axis.

5. The luminaire of claim 4 wherein the prism array includes a second cross-sectional profile that alternates orientation along a second axis that is different than the first axis.

6. The luminaire of claim 5 wherein the second axis is substantially perpendicular to the first axis.

7. The luminaire of claim 5 wherein the second axis is offset about 60 degrees relative to the first axis.

8. The luminaire of claim 5 wherein the prism array includes a third cross-sectional profile that alternates orientation along a third axis that is different than the second axis and the first axis.

9. The luminaire of claim 8 wherein the third axis is offset about 60 degrees relative to the second axis.

10. The luminaire of claim 1 wherein the light guide is substantially solid.

11. The luminaire of claim 10 wherein the light guide includes polymethyl methacrylate.

12. The luminaire of claim 1 wherein the prism array is disposed on a top surface of the light guide.

13. The luminaire of claim 1 wherein the prism array includes prism facets having more than one plane on at least one facet.

14. The luminaire of claim 1 wherein the prism array includes curved prism tips.

15. The luminaire of claim 1 wherein the prism array includes curved valleys.

16. The luminaire of claim 1, wherein substantially all of the valleys are disposed in about a second single plane.

17. A luminaire comprising:

a light source;

a light guide that receives light radiating from the light source; and a tilted prism array for redirecting the light exiting the light guide, the prism array including a cross-sectional profile that periodically alternates orientation along a first axis, the prism array including peaks and valleys, substantially all of the peaks being disposed in about a single plane.

18. The luminaire of claim 17 wherein the prism array includes a second cross-sectional profile that periodically alternates orientation along a second axis.

19. The luminaire of claim 18 wherein the prism array includes a third cross-sectional profile that periodically alternates orientation along a third axis.

20. The luminaire of claim 17 wherein the prism array is disposed on a top surface of the light guide.

21. A method for redirecting light comprising:

providing a light source;

receiving light radiating from the light source in a light guide; and redirecting the light in a first direction with a tilted prism array that includes a cross-sectional profile that periodically alternates orientation along a first axis, the prism array including peaks mud valleys, substantially all of the peaks being disposed in about a single plane.

22. The method of claim 21 wherein the prism array includes a second cross-sectional profile that alternates orientation along a second axis that is different than the first axis.

23. The method of claim 22 wherein the prism array includes a third cross-sectional profile that alternates orientation along a third axis that is different than the second axis and the first axis.

24. A luminaire, comprising:

a light source;

a light guide that receives light radiating from the light source; and a prism array for redirecting light, the prism array including a first group including a plurality of prisms tilted in a first direction and a second group including a plurality of prisms tilted inn second direction, the first and second groups being disposed along the light guide in an alternating fashion, the prism array including peaks and valleys, substantially all of the peaks, being disposed in about a single plane.

25. The luminaire of claim 24, wherein substantially all of the valleys are disposed in about a second single plane.

* * * * *

UNITED STATES PATENT AND TRADEMARK OFFICE
CERTIFICATE OF CORRECTION

PATENT NO. : 6,854,855 B2
DATED : February 15, 2005
INVENTOR(S) : James F. Munro and John A. Futhey It is certified that error appears in the above-identified patent and that said Letters Patent is hereby corrected as shown below:

Column 6,
Line 57, delete the word, "may" and insert therefor, -- array --;

Column 8,
Line 11, delete the word "mud" and insert therfor, -- and --;
Line 29, delete the word "inn" and insert therefor, -- in a --; and
Line 32, delete the comma between the words, "peaks, being" so that it reads "peaks being".

Signed and Sealed this

Seventeenth Day of May, 2005

JON W. DUDAS
*Director of the United States Patent and Trademark Office*